(12) United States Patent
Yoshino et al.

(10) Patent No.: US 6,639,421 B1
(45) Date of Patent: Oct. 28, 2003

(54) MEASURING APPARATUS AND METHOD FOR MEASURING CHARACTERISTIC OF SOLAR CELL

(75) Inventors: Takehito Yoshino, Nara (JP); Takashi Ohtsuka, Kyotanabe (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/691,130

(22) Filed: Oct. 19, 2000

Related U.S. Application Data

(62) Division of application No. 09/106,469, filed on Jun. 30, 1998, now Pat. No. 6,169,414.

(30) Foreign Application Priority Data

Jun. 30, 1997 (JP) .............................. 9-174890

(51) Int. Cl.⁷ ............................................. G01R 31/26
(52) U.S. Cl. ..................................................... 324/767
(58) Field of Search ................................ 324/766, 767, 324/765; 136/290

(56) References Cited

U.S. PATENT DOCUMENTS

| | | | | |
|---|---|---|---|---|
| 3,630,627 A | | 12/1971 | Low et al. .................. 356/222 |
| 4,205,265 A | | 5/1980 | Staebler .................. 324/158 D |
| 4,353,161 A | | 10/1982 | Turner .......................... 29/572 |
| 4,419,530 A | | 12/1983 | Nath .......................... 136/251 |
| 4,467,438 A | * | 8/1984 | Zerlaut et al. ............... 356/405 |
| 4,533,870 A | | 8/1985 | Bauko et al. ............ 324/158 D |
| 4,649,334 A | | 3/1987 | Nakajima .................... 323/299 |
| 4,712,063 A | * | 12/1987 | Osterwald et al. .......... 324/766 |
| 5,945,839 A | * | 8/1999 | Hyvarinen .................. 324/765 |
| 5,955,885 A | * | 9/1999 | Kurokami et al. .......... 324/426 |
| 6,154,034 A | * | 11/2000 | Lovelady et al. ........... 324/501 |

FOREIGN PATENT DOCUMENTS

EP 0 756 178 A2 7/1996

* cited by examiner

*Primary Examiner*—Kamand Cuneo
*Assistant Examiner*—Russell M. Kobert
(74) *Attorney, Agent, or Firm*—Fitzpatrick, Cella, Harper & Scinto

(57) ABSTRACT

A predetermined area of a photo-sensing surface of a solar cell is illuminated, and a voltage vs. current characteristic is measured. Note, the rest of the photo-sensing surface which is not illuminated is called a dark area. Next, in a dark state in which the photo-sensing surface is not illuminated, a dark characteristic of the solar cell is measured. The obtained dark characteristic is multiplied by a ratio of the area of the dark area to the area of the photo-sensing surface, thereby a dark characteristic of the dark area is calculated. Then, a difference characteristic between the measured voltage vs. current characteristic and the dark characteristic of the dark area is calculated. The difference characteristic is multiplied by a ratio of the area of the photo-sensing surface to the area of the illuminated portion, thereby a voltage vs. current characteristic of the solar cell in a state corresponding to that the entire area of the photo-sensing surface is illuminated at once is obtained.

7 Claims, 11 Drawing Sheets

|  | MAXIMUM POWER Pmax(W) | OPEN-CURRENT VOLTAGE Voc(V) | SHORT-CIRCUIT CURRENT Isc(A) |
| --- | --- | --- | --- |
| EXPERIMENT 1 | 0.815 | 2.06 | 0.591 |
| EXPERIMENT 2 | 0.804 | 2.06 | 0.578 |
| EXPERIMENT 3 | 0.787 | 2.04 | 0.578 |
| COMPARISON EXPERIMENT | 0.788 | 2.04 | 0.576 |

FIG. 13

MEASURING APPARATUS AND METHOD FOR MEASURING CHARACTERISTIC OF SOLAR CELL

This is a divisional application of application Ser. No. 09/106,469, now U.S. Pat. No. 6,169,414, filed Jun. 30, 1998, and allowed Jul. 20, 2000.

BACKGROUND OF THE INVENTION

The present invention relates to a measuring apparatus and method of measuring a characteristic of a solar cell and, more particularly, to a measuring apparatus and method of measuring a photoelectric conversion characteristic of a solar cell having a broader photo-sensing area than an illuminated area by a light source.

Photovoltaic power generation has been collecting interests of many people as a clean power generation method which will meet an increasing demand for electric power and does not cause the destruction of the environment, since it does not cause environmental problems, such as radioactive contamination and anathermal of the earth, further, sunlight falls everywhere on the earth with some distribution inequality, and relatively large power generation efficiency is realized without a complicated and large facility. Accordingly, various studies and development are made on photovoltaic power generation to fit for practical use.

Upon studying and developing a solar cell, not only manufacturing technique of a solar cell, but also technique for evaluating the output characteristic of a manufactured solar cell are very important items. As a method of evaluating an output characteristic of a solar cell, a method of studying a voltage vs. current characteristic (voltage/current characteristic) of a solar cell is generally used. FIG. 2 shows a configuration of an apparatus for evaluating the voltage/current characteristic. In FIG. 2, reference numeral 201 denotes a solar cell which is the object of evaluation; 202, a direct current (DC) power source; 203, wires; 204, an ammeter; 205, a voltmeter; 206, wires used for measuring voltage; 207, a computer; 208, a light source; and 209, a shutter.

The DC power source 202, controlled by the computer 207, is connected to the solar cell 201 via the wire 203 and the ammeter 204. Generally, a bipolar DC power source is used as the DC power source 202; however, an electronic load may be used instead. Further, the voltmeter 205 is connected across the solar cell 201. The values of current and voltage measured by the ammeter 204 and the voltmeter 205, respectively, are inputted to the computer 207. The light source 208 emits standard light for characteristic measurement set to the quantity of light of 1sun (=1000 W/m$^2$) and spectrum of AM1.5, which conforms to Japan Industrial Standards (JIS). Illuminating and shielding of light on/from the solar cell 201 are performed by controlling open/close of the shutter 209 by the computer 207.

A method of measuring the voltage/current characteristic of the solar cell 201 using the above apparatus is explained below.

First, the light source 208 is warmed up and adjustment for emitting a standard quantity of light is performed. In this stage, the light source 208 is on and the shutter 209 is closed. Next, the solar cell 201, which is the object of the measurement, is set. Then, the shutter 209 is opened and the entire surface of the solar cell 201 is illuminated with the standard light. Under this condition, the computer 207 controls the DC current source 202 to output a voltage. The voltage to be applied across the solar cell 201 depends upon the type of the solar cell 201, and the optimum voltage is predetermined for each type of a solar cell.

In an operational sequence for measuring the voltage/current characteristic, while gradually changing output voltage of the DC power source 202, voltage values across the solar cell 201 measured by the voltmeter 205 and current values measured by the ammeter 204 are stored in memory of the computer 207.

After changing the output voltage of the DC power source 202 across the voltage range necessary for the measurement, the shutter 209 is closed, and the solar cell 201 is removed. Then, the voltage value data and the current value data stored in the memory of the computer 207 is graphed using a proper software, and a voltage/current characteristic curve as shown in FIG. 3 is obtained.

FIG. 3 is a graph showing an example of voltage/current characteristic of the solar cell 201. In FIG. 3, V in the abscissa shows voltage, and I in the ordinate shows current. A curve C in FIG. 3 is obtained by connecting points representing the measured voltage values and current values plotted on the graph. A point K on the curve C is the point where the product of the voltage and the current becomes maximum, i.e., the point where maximum electric power is taken out, and generally called the optimum working point. The electric power taken out at the optimum working point is the rated power.

Photovoltaic power generation has been rapidly spreading recently. In a residence, a solar panel is often installed on the roof, for instance, and in an isolated island, a solar panel is often installed on a rack. In order to reduce the number of steps for installing the solar panel, a photo-sensing surface of each solar cell tends to be broadened. For measuring characteristics of such a solar cell having a broad surface, a light source capable of illuminating an area corresponding to the entire surface of the solar cell is necessary; however, it is very hard to obtain a light source of that kind.

Generally, a Xenon lamp is most widely used as the light source, and a solar simulator using the Xenon lamp is used. However, the price of the solar simulator increases rapidly as the area that the Xenon lamp can illuminate increases. The increase in price is caused since it becomes harder to manufacture an air-mass filter and a condenser lens, both included in a solar simulator, as their sizes become larger, and the required output power from a power source for the lamp is extremely large. As a practical fixed-light type solar simulator, one having a light source capable of illuminating an area of about 50 cm by 50 cm is the largest on the current market. There is a simulator, capable of illuminating an area of about 1 m by 1 m, in which a lamp, the light source, pulses to decrease the required output power of a power source for the lamp. However, since the sizes of parts other than the power source for the lamp are the same as those of the fixed-light type solar simulator, such a solar simulator is also very expensive.

Thus, the solar simulator for measurement and test having a light source is expensive as described above; therefore, manufacturing cost of a solar cell increases. Accordingly, a method capable of measuring the characteristic of a solar cell having a broad surface at low cost is desired earnestly. Further, regarding a solar cell having a photo-sensing surface much greater than 1 m by 1 m, since a light source capable of illuminating such a broad area is not available, it is not possible, practically, to measure the characteristic of the solar cell.

SUMMARY OF THE INVENTION

The present invention has been made in consideration of the above situation, and has as its object to provide a measuring apparatus and method of measuring a characteristic of a solar cell having a large photo-sensing surface at low cost.

According to the present invention, the foregoing object is obtained by providing a measuring method of measuring a characteristic of a solar cell comprising the steps of: measuring a first characteristic of the solar cell while illuminating a predetermined area of a photo-sensing surface of the solar cell, wherein an area of the photo-sensing surface which is not illuminated is called a dark area; measuring a second characteristic of the solar cell in a dark state in which the photo-sensing surface is shielded from light; calculating a third characteristic by multiplying the second characteristic by an area ratio of an area of the dark area to an area of the photo-sensing surface; and calculating a characteristic of the predetermined illuminated area on the basis of the first and third characteristics.

Further, according to the present invention, the foregoing object is also attained by providing a measuring method of measuring a characteristic of a solar cell comprising the steps of: segmenting a photo-sensing surface of the solar cell into a plurality of blocks each having a predetermined area; measuring a first characteristic of the solar cell while illuminating each of the plurality of blocks, wherein an area of the photo-sensing surface which is not illuminated is called dark area; measuring a second characteristic of the solar cell in a dark state in which the photo-sensing surface is shielded from light; calculating a third characteristic by multiplying the second characteristic by an area ratio of an area of the dark area to an area of the photo-sensing surface; and calculating a characteristic of each of the plurality of the segmented block on the basis of the first and third characteristics of the corresponding block.

Furthermore, according to the present invention, the foregoing object is also attained by providing a manufacturing method of manufacturing a solar cell comprising a measuring step of measuring a characteristic of the solar cell in accordance with either of the above measuring methods.

Further, according to the present invention, the foregoing object is also attained by providing a measuring apparatus for measuring a characteristic of a solar cell, comprising: a light source for illuminating a photo-sensing surface of the solar cell; and a mask, provided between the photo-sensing surface and the light source, for limiting an area to be illuminated on the photo-sensing surface to a predetermined area.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 13 is a table showing results of first to third experiments and a comparison experiment.

DETAILED DESCRIPTION OF THE PREFERRED EMBODIMENT

Preferred embodiment on a measuring method of measuring a solar cell according to the present invention will be described in detail in accordance with the accompanying drawings.

[Measuring Apparatus for Measuring Characteristic of Solar Cell]

Figure 1:
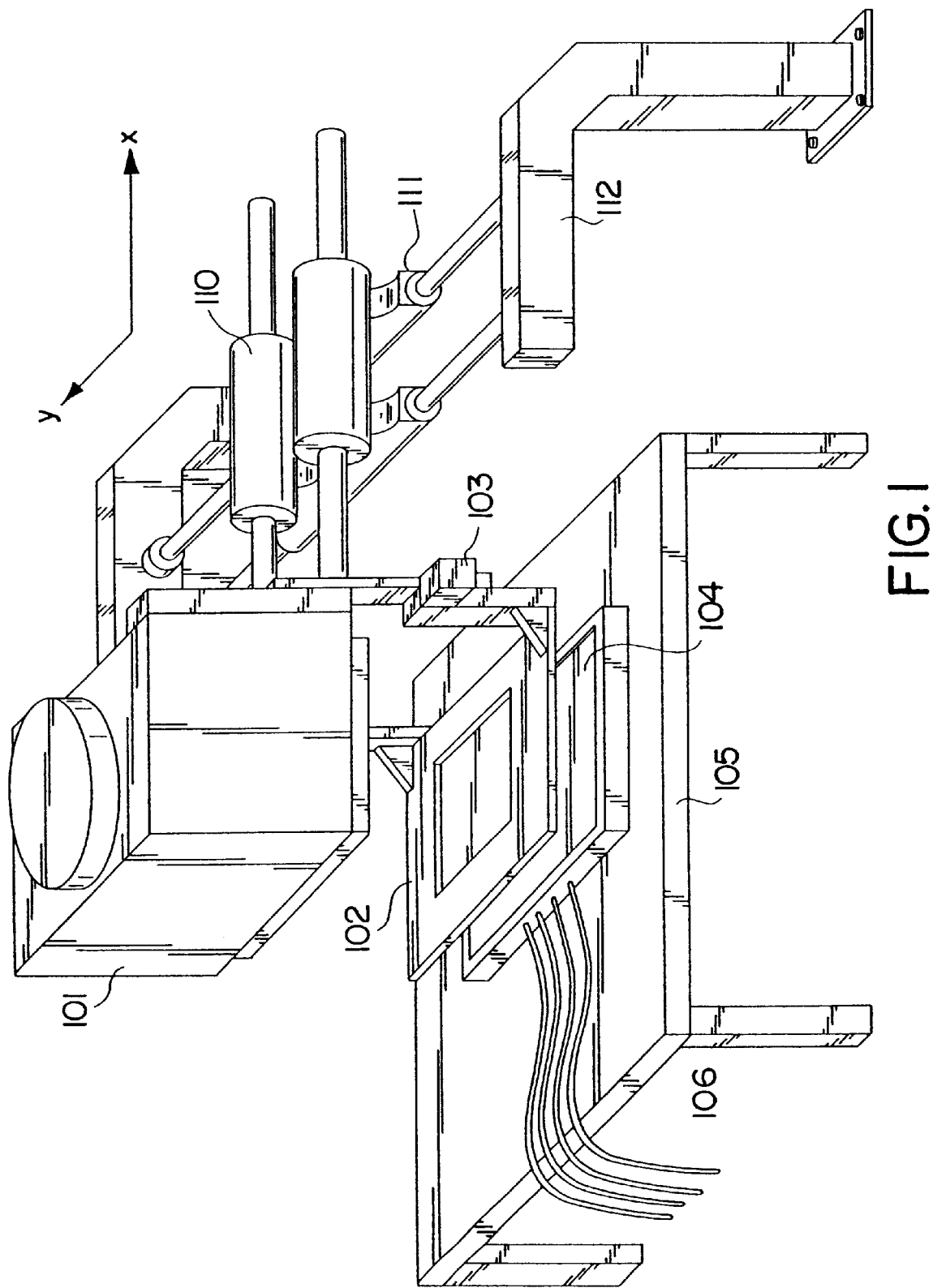
FIG. 1 is a perspective view illustrating a configuration of a measuring apparatus for measuring a characteristic of a solar cell according to the present invention.

FIG. 1 is a perspective view illustrating a configuration of an apparatus performing a measuring method according to the present invention. In FIG. 1, reference numeral 101 denotes a light source; 102, a mask; 103, a vertical movement unit; 104, a solar cell; 105, a sample holding stage; 106, wires; 110 and 111, driving units; and 112, a rack.

The light source 101 has a function for illuminating the solar cell 104 with standard light for measurement, and has a shutter unit inside.

The mask 102 is used for precisely determining the area to be illuminated on the solar cell 104. It is preferred to put rubber on the side, which touches the solar cell 104, of the mask 102 so that the solar cell 104 is not damaged. Further, the effective illuminated area by the light source 101 is adjusted slightly larger than an opening portion of the mask 102 but smaller than the outer size of the mask 102.

The vertical movement unit 103 is used for moving the mask 102 downward for making the mask 102 contact with the solar cell 104, and upward before moving the light source 101 and the mask 102 in the horizontal direction.

The solar cell 104 is set on the sample holding stage 105. When necessary, the solar cell 104 may be fixed on the stage 105 by a clamp (not shown) to prevent the solar cell 104 from moving on the stage 105 during measuring of the characteristic. Further, the solar cell 104 is connected to a power source for characteristic measurement (not shown), for instance, by the wires 106. A bipolar DC power source, a voltmeter and an ammeter which are used for measuring a characteristic, and wiring thereof are the same as those explained with reference to FIG. 2, therefore, the explanation of them are omitted.

The driving unit 110 is used for moving the light source 101 and the mask 102 in the horizontal direction in FIG. 1 (X-direction), and the driving unit 111 is used for moving the light source 101 and the mask 102 in the depth direction in FIG. 1 (Y-direction).

The rack 112 is used for installing the measuring apparatus comprising the light source 101, the mask 102, the vertical movement unit 103, the X-direction driving unit 110 and the Y-direction driving unit on a setting floor.

Figure 2:
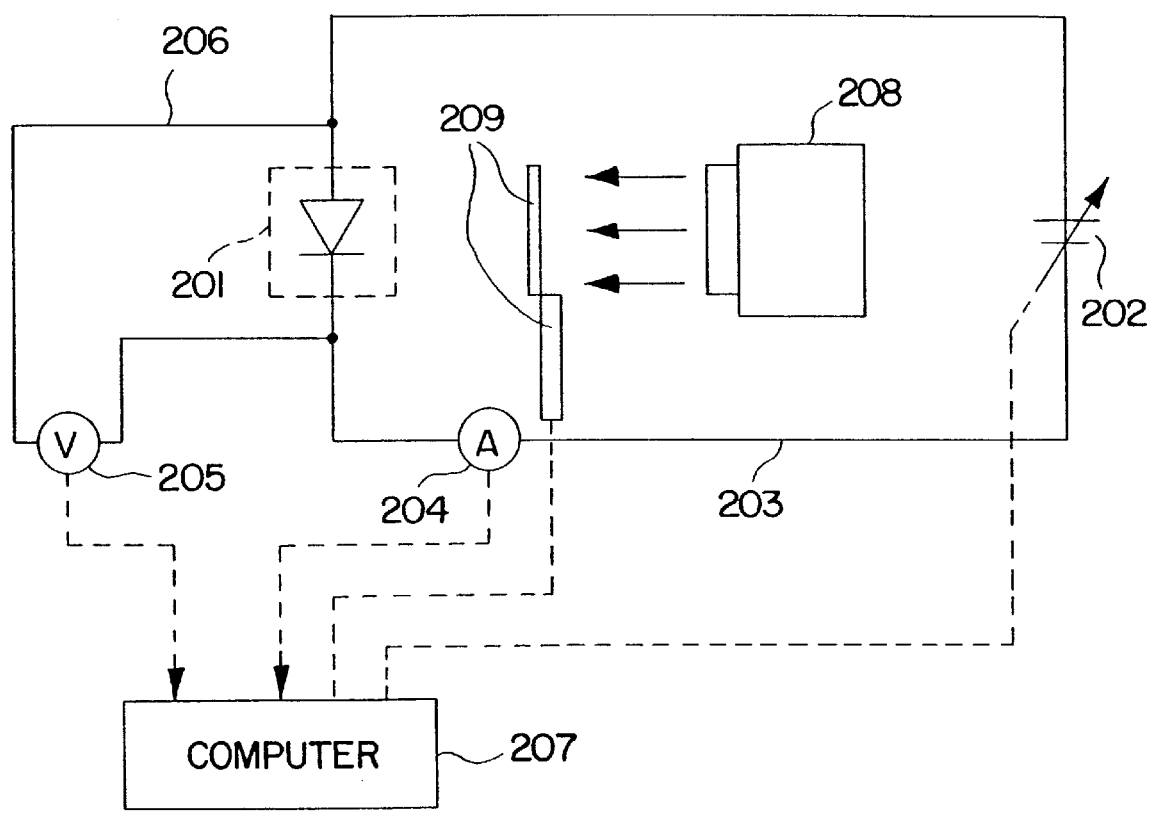
FIG. 2 is a view for explaining a method of measuring a characteristic of a solar cell.
Figure 3:
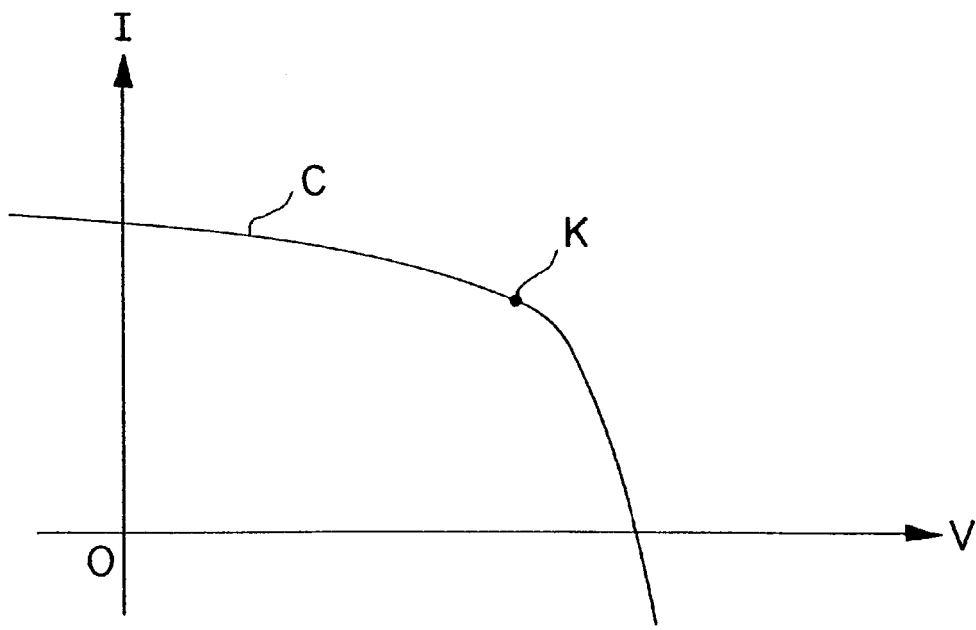
FIG. 3 is a graph showing an example of a voltage/current characteristic of a solar cell.

Note, the difference between the measuring apparatus shown in FIG. 1 and the measuring apparatus shown in FIG. 2 is that, in the latter one, the illuminated area by the light source 208 corresponds to the entire photo-sensing area of the solar cell 201, whereas, in the former one, the illuminated area by the light source 101 corresponds to a portion of the photo-sensing area of the solar cell 104.

[Dark Characteristic of Solar Cell, and Bright Characteristic of Solar Cell When Illuminated by Part]

Figure 12:
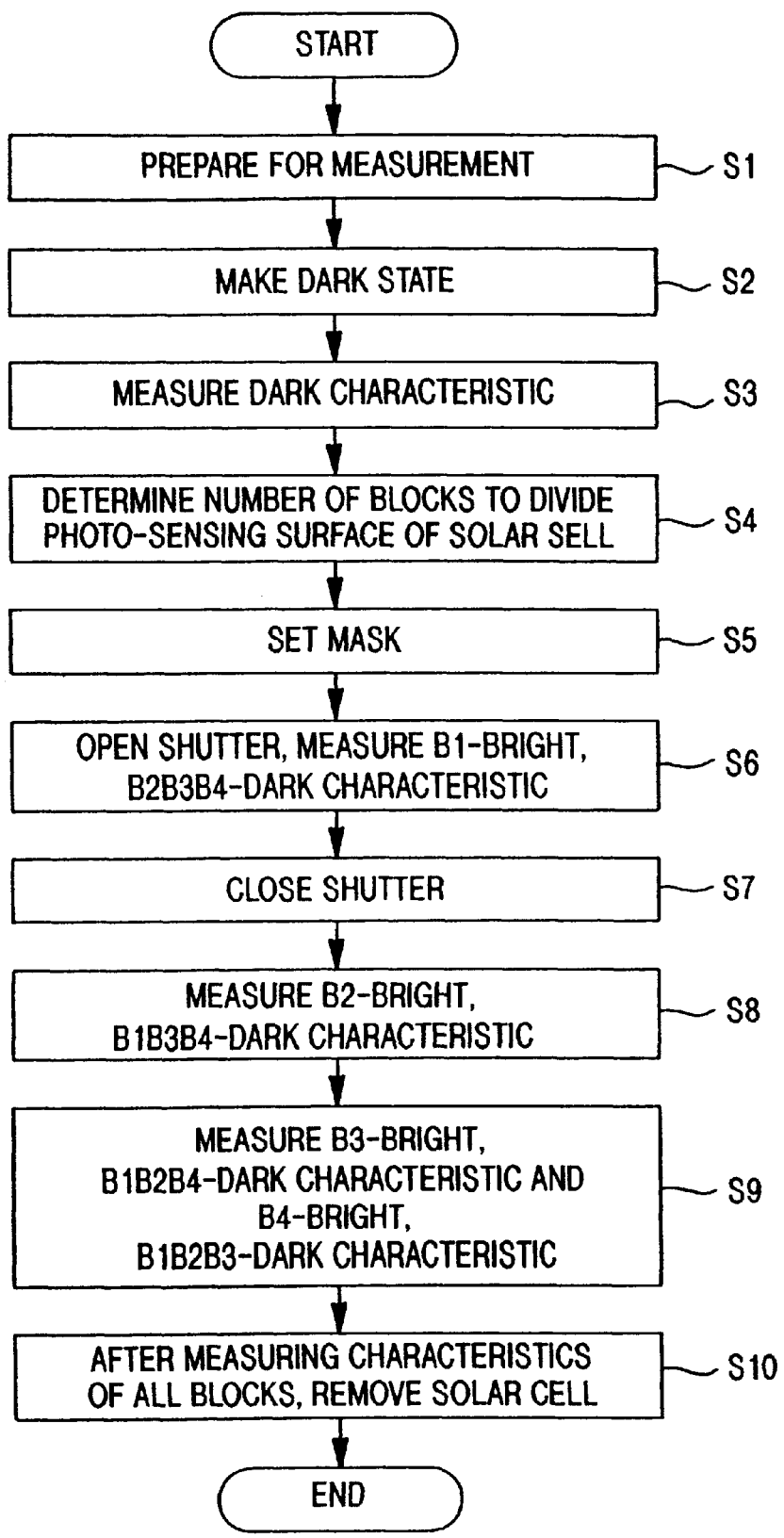
FIG. 12 is a flowchart showing a processing sequence of the measuring method of measuring the solar cell characteristics according to the present invention.

Below, a processing sequence for performing the measuring method of measuring a characteristic of a solar cell using the apparatus illustrated in FIG. 1 according to the present invention is explained. FIG. 12 is a flowchart showing the measurement sequence. The sequence shown in FIG. 12 is executed by an operator and/or the computer 207, which is shown in FIG. 2.

(Step S1) It is assumed that the apparatus is in a state that necessary warming up time has elapsed since the light source 101 is turned on, and a shutter (not shown) is closed. Further, ambient temperature is set to temperature suitable for measuring a characteristic of a solar cell. Specifically, the temperature is kept at about 25° C. Under these conditions, the solar cell 104 is set on the sample holding stage 105 and fixed by a clamp (not shown) when necessary. Thereafter, the wires 106 are connected to the solar cell 104.

(Step S2) The stage 105 holding the solar cell 104 and its peripheral area are completely shielded from light so that no light incidents on the solar cell 104, or shielded to the level in which the quantity of incidenting light is substantially ignorable with respect to 1sun. This state is called dark state.

Figure 4:
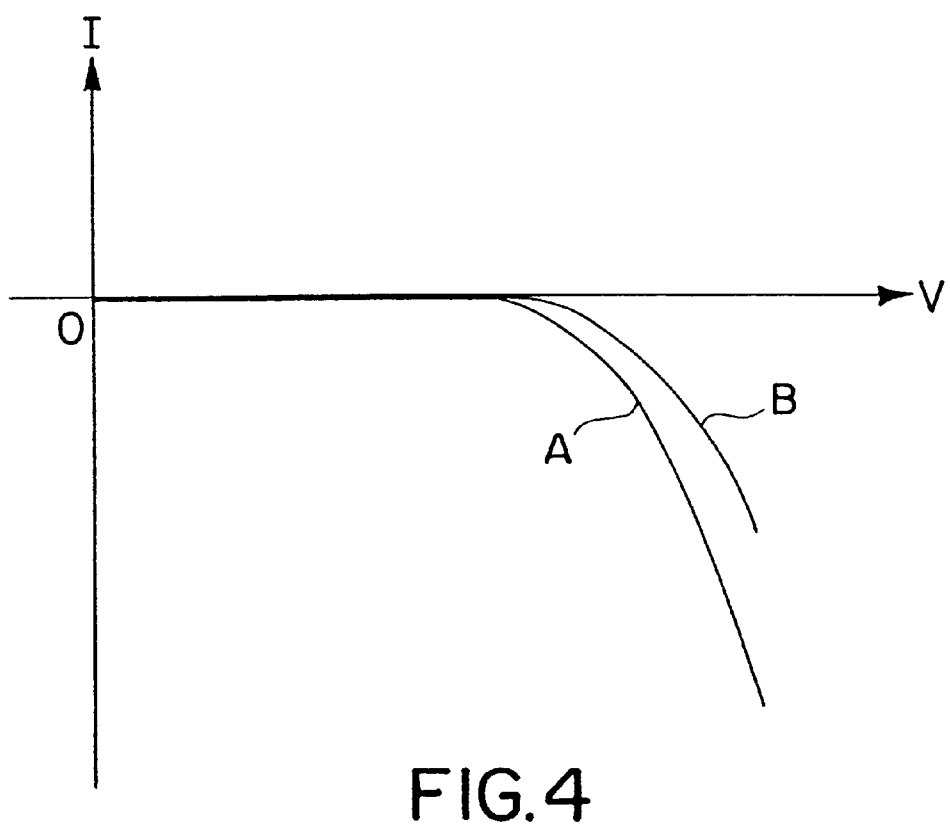
FIG. 4 is a graph showing an example of a voltage/current characteristic (dark characteristic) of a solar cell in a dark state.

(Step S3) Under the dark state of step S2, the voltage/current characteristic, explained with reference to FIG. 2, is measured, thereby obtaining the voltage/current characteristic of the solar cell 104 in the dark state (called "dark characteristic" hereinafter). The curve A shown in FIG. 4 shows a common measurement result of the dark characteristic. Note, the dark characteristic measured in this step is of the entire surface of the solar cell 104.

Figure 5:
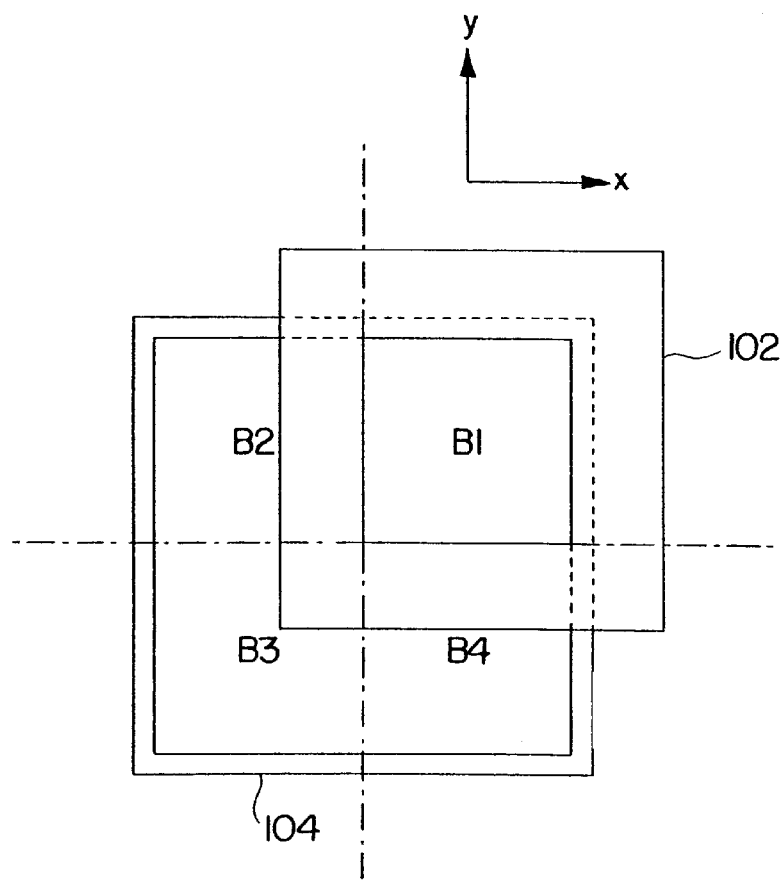
FIG. 5 is a view for explaining an example of measuring method of a voltage/current characteristic by dividing photo-sensing surface of the solar cell into four blocks.

(Step S4) Next, the voltage/current characteristic of the solar cell 104 is measured when it is illuminated. In this step, the photo-sensing surface of the solar cell 104 is divided into four blocks, and the measurement is performed individually for the respective four blocks. Note, the number of blocks may be selected depending upon the size of the photo-sensing surface of the solar cell 104, an illuminated area by the light source 101, and the size of the opening of the mask 102. FIG. 5 is an explanatory view for explaining an example when the photo-sensing surface of the solar cell 104 is divided or segmented into four blocks. In FIG. 5, B1 to B4 indicate the respective four blocks of the solar cell 104. The light source 101 is placed on top of the mask 102 with respect to FIG. 5, and faces to the solar cell 104 and the mask 102.

(Step S5) After the mask 102 is lifted up to a height where the mask 102 does not touch the solar cell 104 using the vertical movement unit 103, the mask 102 and the light source 101 are moved by the driving units 110 and 111 to positions where the block B1 is illuminated.

Figure 6:
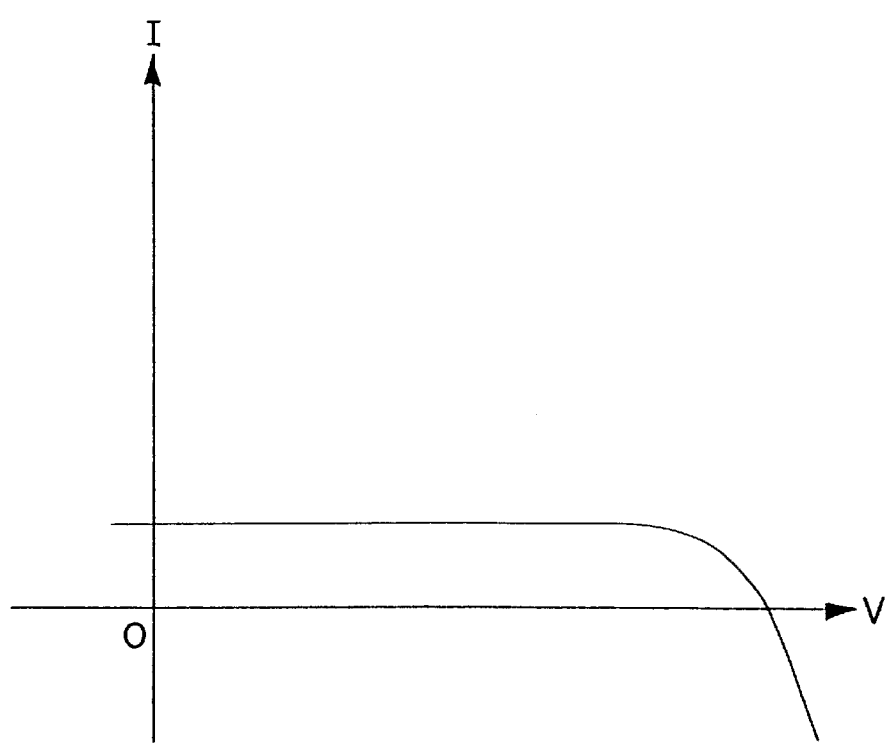
FIG. 6 is a graph showing an example of a voltage/current characteristic when only one divided block of the solar cell is illuminated and the rest of the blocks are put in a dark state.

(Step S6) The vertical movement unit 103 moves the mask 102 down to a height where the backside of the mask 102 is contact with the solar cell 104. At this time, it is necessary to make the backside of the mask 102 contact with the solar cell 104 so that no space exists between the mask 102 and the solar cell 104. Under this condition, the shutter is opened, and the block B1 of the solar cell 104 is illuminated while keeping other blocks in the dark state, and a voltage/current characteristic of the solar cell 104 (referred to as "B1-bright, B2B3B4-dark characteristic" hereinafter) is measured. FIG. 6 shows the measurement result.

(Step S7) After measuring the B1-bright, B2B3B4-dark characteristic, the shutter is closed, thereby the illuminating of the block B1 is terminated.

(Step S8) Thereafter, the vertical moving unit 103 and the driving units 110 and 111 move the light source 101 and the mask 102 on the block B2, and measurement as performed in step S6 is performed. More specifically, the block B2 of the solar cell 104 is illuminated while keeping the rest of the blocks in the dark state, then a voltage/current characteristic (B2-bright, B1B3B4-dark characteristic) of the solar cell 104 is measured.

(Step S9) Further, by repeating processes corresponding to steps S7 and S8, a B3-bright, B1B2B4-dark characteristic and a B4-bright, B1B2B3-dark characteristic of the solar cell 104 are measured.

(Step S10) After measuring the voltage/current characteristics for all the blocks, the shutter is closed, the mask 102 is lifted up, the wires 106 are disconnected from the solar cell 104, and the solar cell 104 is unloaded from the stage 105.

FIG. 6 shows a graph of the measured voltage/current characteristics of the four blocks, namely, the B1-bright, B2B3B4-dark characteristic, the B2-bright, B1B3B4-dark characteristic, the B3-bright, B1B2B4-dark characteristic, and the B4-bright, B1B2B3-dark characteristic. The characteristic curves of the four measurement results coincide with each other in FIG. 6. This shows that characteristic of the solar cell 104 is the same over the photo-sensing surface. If the characteristic of the solar cell 104 is not similar enough over the photo-sensing surface, obtained four curves do not coincide perfectly.

Figure 7:
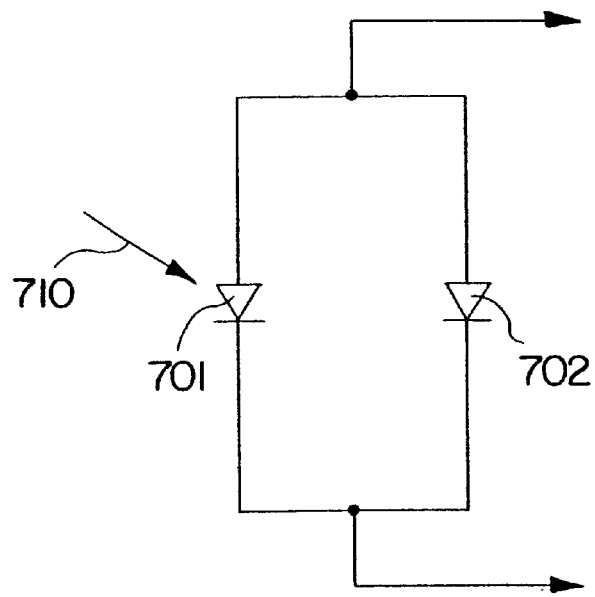
FIG. 7 shows an equivalent circuit of the solar cell when a part of the solar cell is illuminated while the rest of the solar cell is shielded from light.

Note, the characteristics obtained by illuminating the solar cell 104 by part in the foregoing operation are different from characteristics measured by each block when the blocks B1 to B4 are physically separated from each other. The reason is that the B1-bright, B2B3B4-dark characteristic, for example, is the sum of the characteristic of the block B1 when it is physically separated from the rest of the blocks and the dark characteristic of the other three blocks, namely, B2 to B4 blocks. In other words, the B1 block is electrically connected to the other three blocks of B2 to B4 in parallel as shown in the equivalent circuit diagram shown in FIG. 7. In FIG. 7, reference numeral 701 denotes the block B1 illuminated by light 710, and reference numeral 702 corresponds to the other three blocks of B2 to B4 in the dark state. Therefore, the characteristic of the solar cell 104 is the sum of a current value of the block B1 and current value of the other three blocks of B2 to B4.

[Bright Characteristic of Block in State Corresponding to State When the Block Is Physically Separated from the Rest]

Below, a method of calculating the voltage/current characteristic in a state corresponding to that the blocks of the solar cell 104 are physically separated from each other, on the basis of the measured four voltage/current characteristics, namely, the B1-bright, B2B3B4-dark characteristic, the B2-bright, B1B3B4-dark characteristic, the B3-bright, B1B2B4-dark characteristic, and the B4-bright, B1B2B3-dark characteristic, and the dark characteristic measured when all the blocks are put in the dark state is explained.

First, since the dark characteristic, shown by the curve A in FIG. 4, is of the four blocks, a curve B, shown in FIG. 4, representing ¾ of the current of the curve A for every voltage is obtained. The curve B represents the dark characteristic of three blocks, i.e., a dark area, which are not illuminated.

Figure 8:
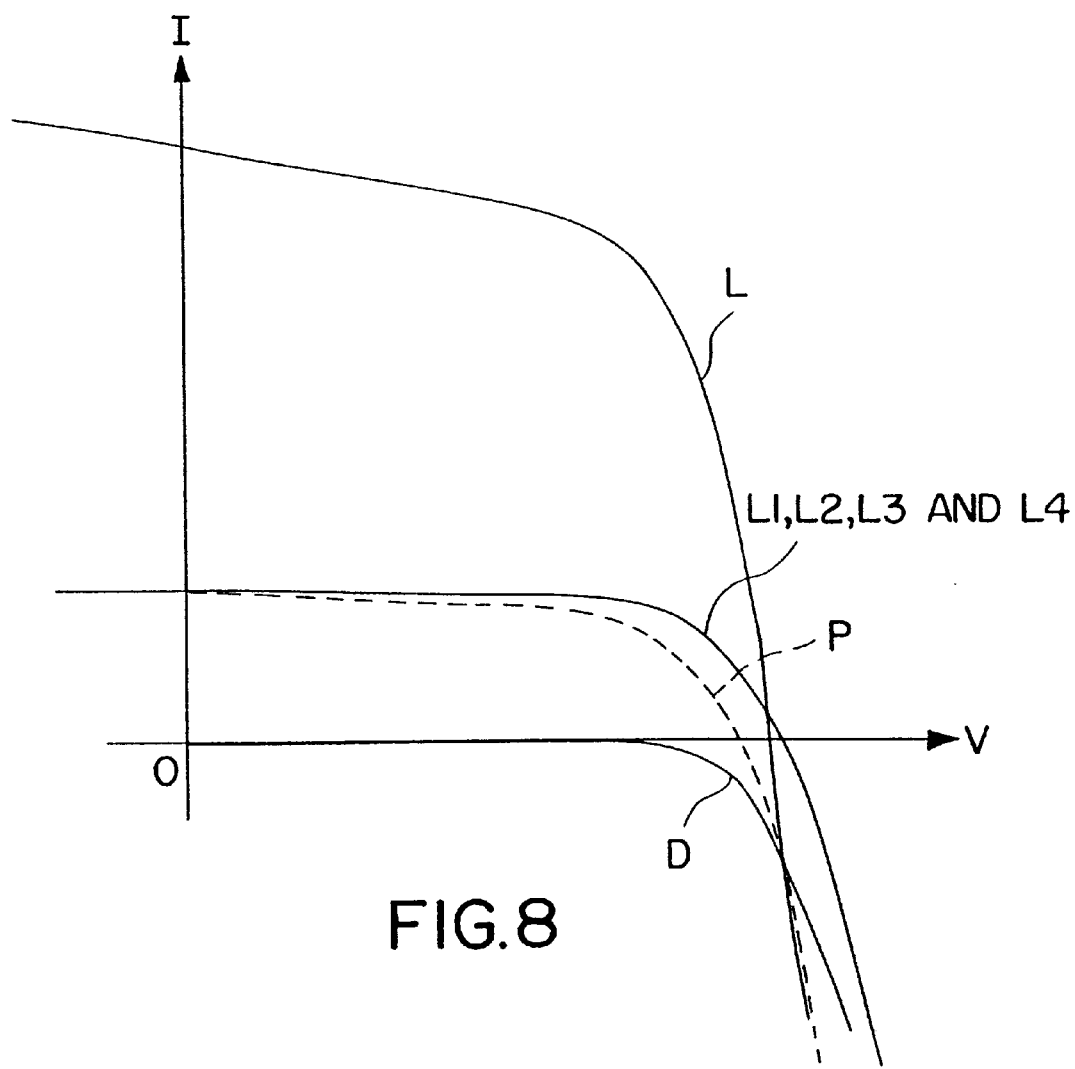
FIG. 8 is a graph showing calculation processes in a measuring method of measuring a characteristic of a solar cell according to the present invention.

A curve D in FIG. 8 corresponds to the curve B in FIG. 4, and a curve P in FIG. 8 corresponds to the curve of the B1-bright, B2B3B4-dark characteristic in FIG. 6. As already described above, the B1-bright, B2B3B4-dark characteristic (curve P) is the sum of the characteristic measured in a state in which the block B1 is physically separated from the rest of the blocks (called "B1 bright characteristic" hereinafter) and the dark characteristic of the other three blocks (curve D). Therefore, the B1 bright characteristic is obtained by subtracting the dark characteristic of the three blocks from the B1-bright, B2B3B4-dark characteristic. A curve L1 in FIG. 8 shows the Bi bright characteristic obtained by performing the foregoing operation.

[Characteristic When the Entire Photo-Sensing Surface of the Solar Cell Is Illuminated]

Next, a method of obtaining the voltage/current characteristic of the entire solar cell 104 is explained.

The method of calculating the B1 bright characteristic is applied to the rest of the three blocks of B2 to B4 to obtain a B2 bright characteristic, a B3 bright characteristic, and a B4 bright characteristic. Curves L2 to L4 in FIG. 8 corresponds to these three bright characteristics. The curves L1 to L4 should be the same when the characteristic is the same over the photo-sensing surface of a solar cell, as shown in FIG. 8. Note, however, if the characteristic is not the same, then the curves do not coincide. The sum of the four bright characteristics is equivalent to the characteristic of the solar cell 104 (curve L in FIG. 8) when the entire photo-sensing surface of the solar cell 104 is illuminated.

As described above, on the basis of the characteristics obtained by illuminating the photo-sensing surface of the solar cell by part and the dark characteristic, it is possible to obtain the characteristic when the entire surface of the solar cell is illuminated. Then, by calculating the maximum product of voltage and current on the curve L in FIG. 8, output of the solar cell when the entire surface is illuminated is obtained. Note, the synthesis of the characteristics, namely, addition of current values at the same voltage is preferably performed by a computer.

Note, if the characteristic is not the same over the photo-sensing surface of the solar cell, it is necessary to obtain bright characteristics of the respective blocks and add the obtained bright characteristics as described above. Whereas, if irregularity of the characteristic of the solar cell over the surface is small enough to be ignored, or when the required accuracy of measurement is not very high, the product of the current value of the B1 bright characteristic, for instance, and the number of blocks may be considered as the characteristic of the solar cell when the entire surface is illuminated. In such a case, a characteristic of a block placed in the central portion, for instance, may be measured as the B1 bright characteristic.

Further, as an extended method of the above operation, the photo-sensing surface of the solar cell may be divided into nine blocks, and characteristics of three blocks, for instance, out of the nine blocks may be measured. Thereafter, on the basis of the characteristics of the three blocks, the characteristic of the solar cell when the entire surface is illuminated is calculated. In the same manner, simplification of measurement may be achieved in various ways depending upon necessity.

Note, in the above calculation sequence, the bright characteristic of each block is obtained first, then the obtained bright characteristics are added; however, the calculation may be performed in different manners. As an example, the B1-bright, B2B3B4-dark characteristic, the B2-bright, B1B3B4-dark characteristic, the B3-bright, B1B2B4-dark characteristic, and the B4-bright, B1B2B3-dark characteristic may be added first, then the current values of the dark characteristic multiplied by three may be subtracted from the sum. In this manner, calculation load is reduced.

[Method for Dividing Solar Cell into Blocks]

In the above explanation, the area of the photo-sensing surface of the solar cell 104 corresponds to the integer multiple number of an illuminated area (area of each block), and specifically, the integer is four. However, the number of division can be arbitrary, and not necessarily be an integer. A case where the number of division is not an integer is shown in FIG. 9.

Figure 9:
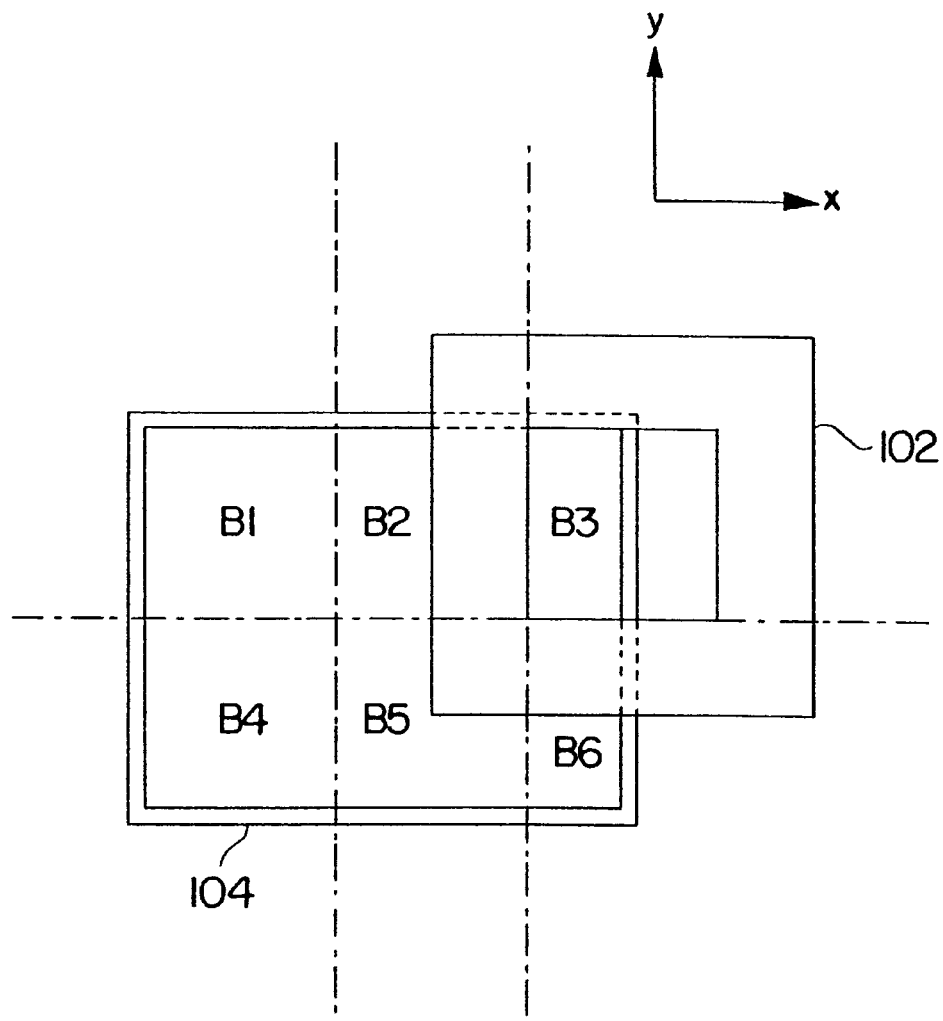
FIG. 9 is an explanatory view for explaining a measuring method of measuring a characteristic of a solar cell by dividing the photo-sensing surface of the solar cell into six blocks.

FIG. 9 is an explanatory view for explaining an example when the photo-sensing surface of the solar cell 104 is divided into six blocks. In FIG. 9, blocks B1, B2, B4 and B5 have the same area as that of the opening of the mask 102, i.e., illuminated area. However, blocks B3 and B6 have smaller area than that of the illuminated area. In such cases, in the illuminated area, the area where the photo-sensing surface exists is calculated as an effective illuminated area, then the similar calculation as described above is to be performed.

[Correction for Series Resistance Component of Solar Cell]

The characteristic of the solar cell when the entire surface of the solar cell is illuminated is obtained by performing the foregoing method on the basis of the characteristics obtained by illuminating the photo-sensing surface of the solar cell by part (corresponding to, e.g., the B1-bright, B2B3B4-dark characteristic, and referred to as "partial bright characteristic" hereinafter) and the dark characteristic. In order to obtain a more accurate result, it is preferable to perform following correction.

Figure 10:
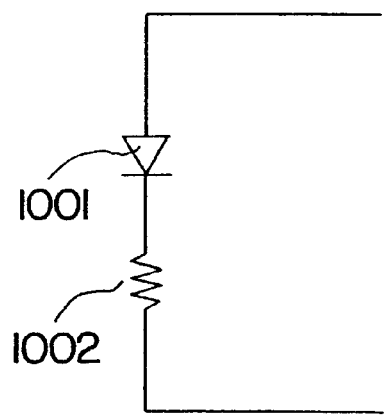
FIG. 10 shows an equivalent circuit of the solar cell.

In the solar cell, there is a series resistance component as shown by an equivalent circuit in FIG. 10. In FIG. 10, reference numeral 1001 denotes an ideal solar cell having no series resistance component, and reference numeral 1002 denotes the series resistance component. Therefore, the voltage measured for obtaining the voltage/current characteristic corresponds to an ideal output voltage of the solar cell 1001 subtracted by a voltage drop due to the series resistance component 1002. Further, in the above measuring method of measuring the characteristic of the solar cell, the current values, which are the base of calculations, are changed upon measuring the dark characteristic and the partial bright characteristic; therefore, they are affected by the voltage drop due to the series resistance component. However, it is the ideal solar cell 1001 that changes its characteristic depending upon the illuminated state; therefore, it is necessary to correct the measured characteristic of the voltage drop component due to the series resistance component 1002.

Figure 11:
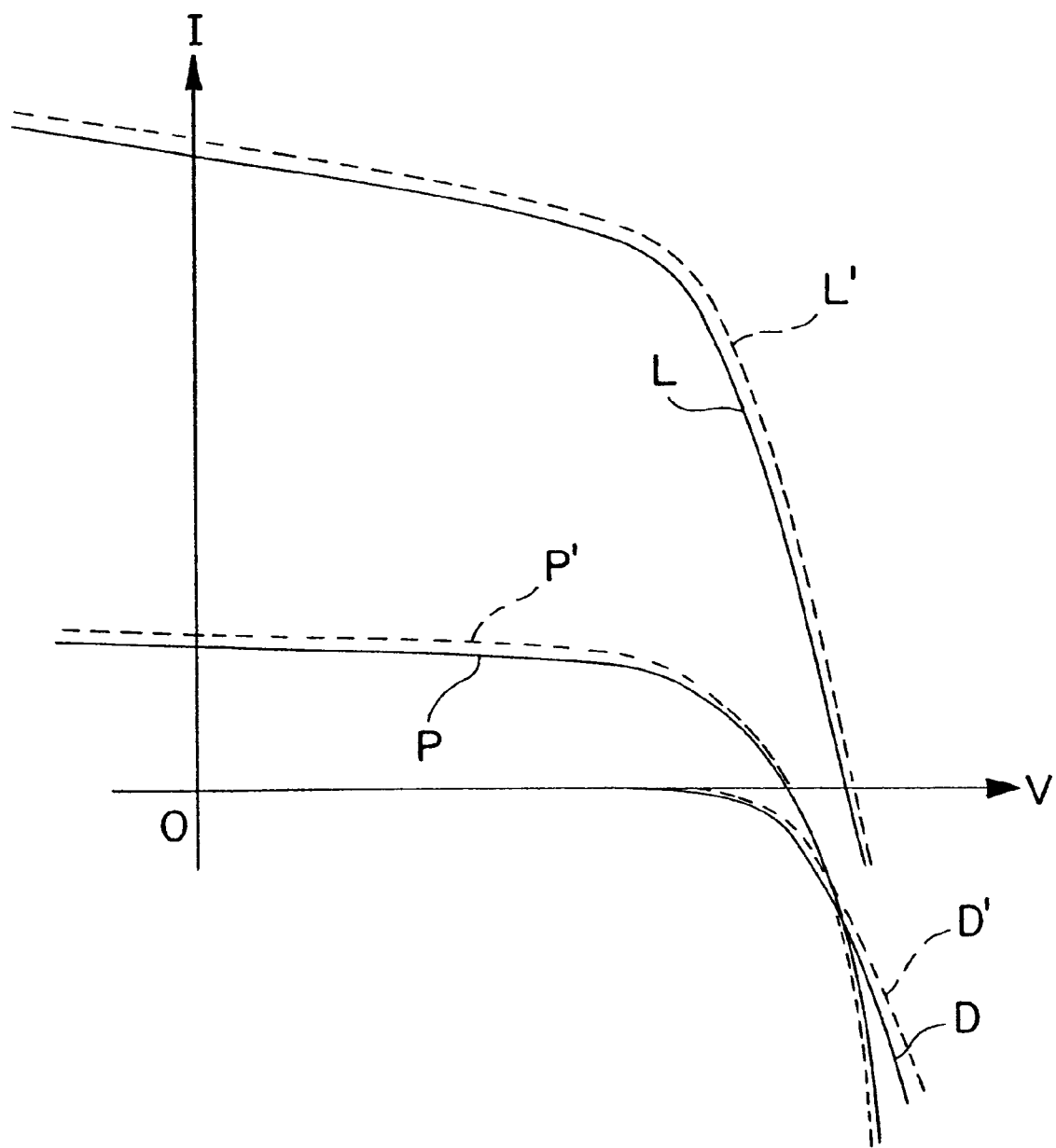
FIG. 11 is a graph for explaining calculation processes in the measuring method of measuring a characteristic of a solar cell with correction for a voltage drop caused by a series resistance component of the solar cell according to the present invention.

More specifically, a characteristic is calculated by eliminating the voltage drop component due to the series resistance component 1002 from the dark characteristic and the partial bright characteristic. As practical calculation, the voltage drop component that is a product of the current value and the series resistance component 1002 at each measurement point is added to the voltage value measured at the corresponding point, and the sum is considered as the actual voltage value at each measurement point. FIG. 11 is a graph showing a result of the correction for the series resistance component 1002. In FIG. 11, a curve D shows the measured dark characteristic, and a curve D' shows the dark characteristic corrected for the voltage drop due to the series resistance component 1002. Further, a curve P shows the partial bright characteristic when a block of the photo-sensing surface of the solar cell is illuminated, and a curve P' shows the partial bright characteristic corrected for the voltage drop due to the series resistance component 1002. Then, a curve L' shows the characteristic of the solar cell when the entire surface is illuminated obtained on the basis of the corrected dark characteristic represented by the curve D' and the corrected partial bright characteristic represented by the curve P'. Further, the curve L is the characteristic which is supposed to be measured by a voltmeter (corresponds to 205 in FIG. 2), and here, it is obtained by subtracting the voltage drop due to the series resistance component from the curve L' (inverse-correction).

The curve L shown in FIG. 11 in the aforesaid operation is the characteristic measured of the entire solar cell. The correction for the voltage drop due to the series resistance component 1002 is necessary if a precise output of the solar cell is desired. However, since calculation load increases with precision, if very high precision is not required, this operation is unnecessary.

The value of the series resistance component 1002 may be obtained by adding series resistances of, e.g., a transparent electrode and a base electrode, for instance, included in the solar cell, or obtained from the slope of the measured characteristic curve, i.e., $\Delta V/\Delta I$.

[Calculation Sequence for Obtaining Characteristic of Solar Cell]

Figure 14A:
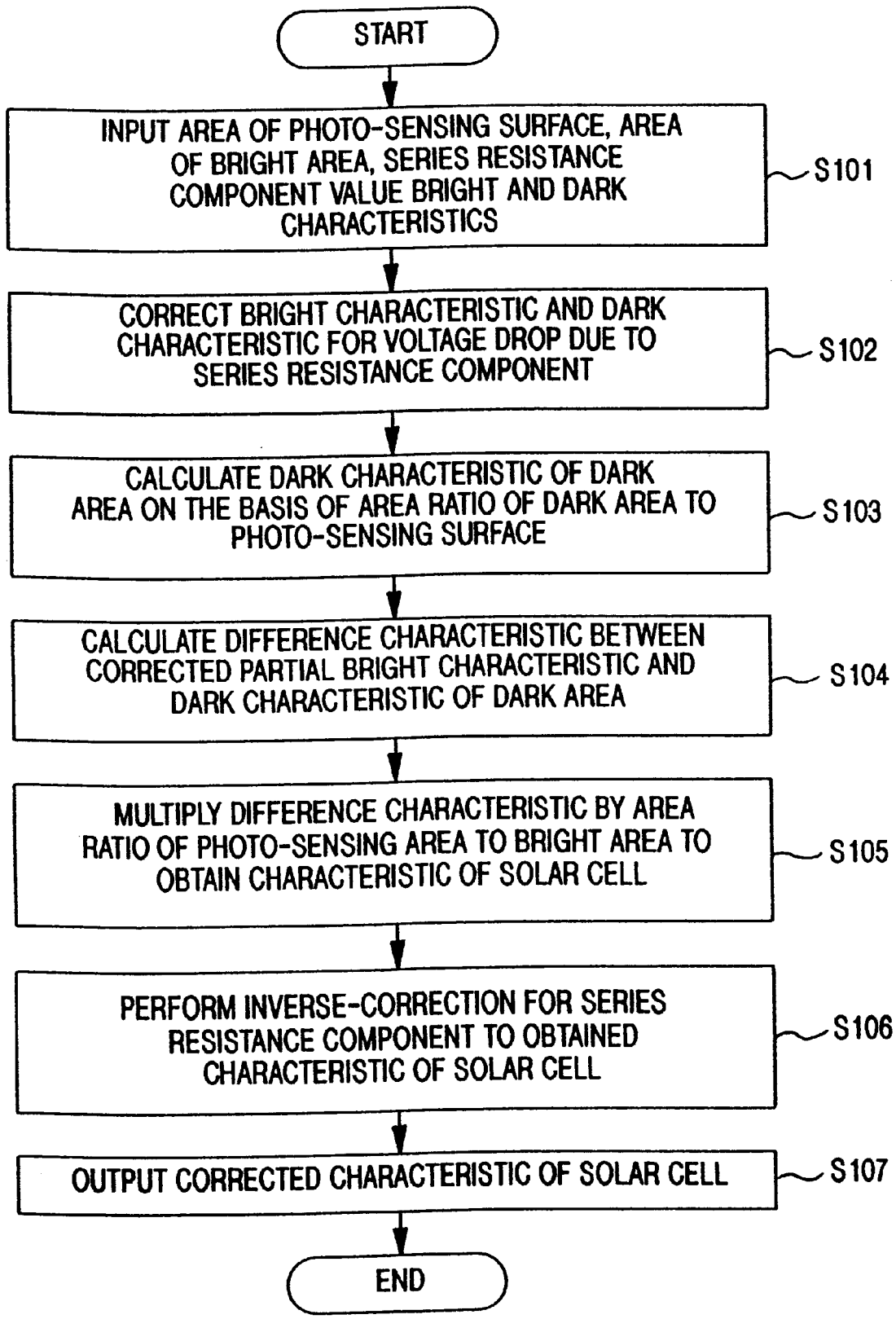
FIGS. 14A and 14B are flowcharts showing calculation sequences for obtaining a characteristic of a solar cell.
Figure 14B:
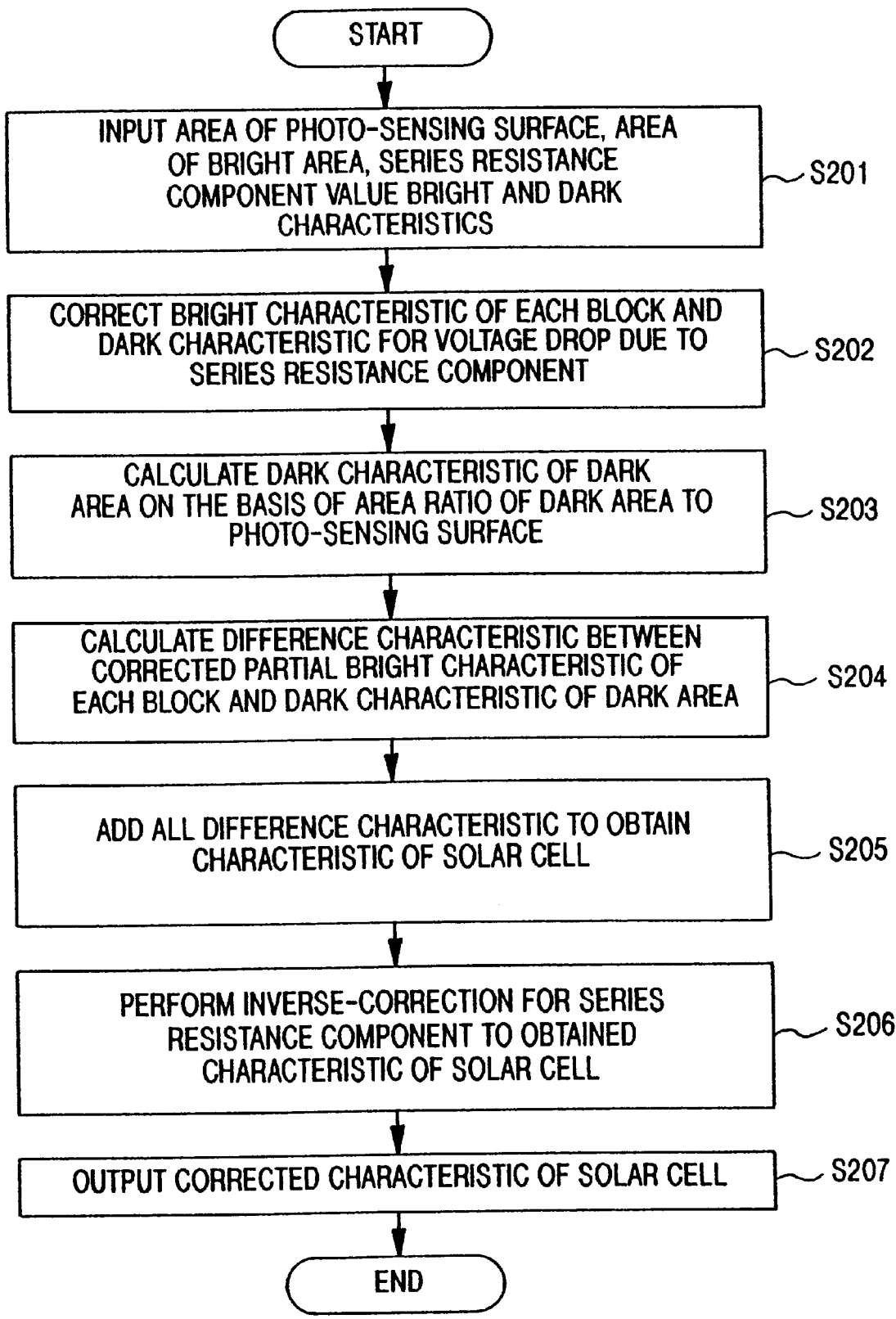

FIGS. 14A and 14B are flowcharts showing calculation sequences for obtaining the characteristic of the solar cell. The calculation is performed by the computer 207 shown in FIG. 2.

The sequence shown in FIG. 14A is for calculating the characteristic of the solar cell in a state corresponding to that the entire photo-sensing surface being illuminated, on the basis of the measured partial bright characteristics when each block having a predetermined area of the photo-sensing surface of the solar cell is sequentially illuminated. Note, in the following explanation, an area corresponding to the illuminated block is called "bright area", and the rest of the photo-sensing surface which is not illuminated is called "dark area".

In step S101, necessary parameters, i.e., an area S of the photo-sensing surface, an area $S_1$ of the bright area, a value of the series resistance component of the solar cell, the measured a partial bright characteristic and a dark characteristic are inputted. In step S102, correction for the voltage drop due to the series resistance component is performed on the partial bright characteristic and the dark characteristic. In step S103, the corrected dark characteristic is multiplied by a ratio of an area $S_D$ of the dark area ($=S-S_1$) to the area S of the photo-sensing surface ($=S_D/S$); thereby a dark characteristic of the dark area is calculated. In step S104, difference characteristic between the corrected partial bright characteristic and dark characteristic is calculated. In step S105, the obtained difference characteristic is multiplied by a ratio of the area S of the photo-sensing surface to the area $S_1$ of the bright area ($=S/S_1$); thereby a voltage/current characteristic in a state corresponding to that the entire photo-sensing surface of the solar cell is illuminated is calculated. Next, in step S106, the voltage/current characteristic obtained in step S105 is further applied with inverse-correction for the series resistance component. Then in step S107, the corrected characteristic of the solar cell is outputted.

The sequence shown in FIG. 14B is for calculating the characteristic of the solar cell in a state corresponding to that the entire photo-sensing surface of the solar cell is illuminated, on the basis of the partial bright characteristics obtained by illuminating each of a plurality of blocks obtained by dividing the photo-sensing surface of the solar cell.

In step S201, necessary parameters, i.e., an area S of the photo-sensing surface, an area of the bright area, a value of the series resistance component of the solar cell, the measured partial bright characteristic of each block and the measured dark characteristic are inputted. In step S202, correction for the voltage drop due to the series resistance component is performed on the partial bright characteristic of each block and the dark characteristic. In step S203, the corrected dark characteristic is multiplied by a ratio of an area $S_D$ of dark area to the area S of the photo-sensing surface; thereby a dark characteristic of the dark area is calculated. In step S204, a difference characteristic between the corrected partial bright characteristic of each block and the corrected dark characteristic of the dark area is calculated. In step S205, all the obtained difference characteristics are added; thereby a voltage/current characteristic in a state corresponding to that the entire photo-sensing surface of the solar cell is illuminated is calculated. Next, in step S206, the voltage/current characteristic obtained in step S205 is further applied with inverse-correction for the series resistance component. Then in step S207, the corrected characteristic of the solar cell is outputted.

Note, as for the outputting of the solar cell characteristic, the obtained result may be displayed on a monitor, or plotted by a plotter or a printer, in a form of characteristic curve. Alternately, data representing the characteristic of the solar cell may be outputted to other computer or a printer.

[Experiment 1]

Using a dark characteristic of a square solar cell, 10 cm each side, and a measured partial bright characteristic of the solar cell when a square, 5 cm each side, in the central portion of the photo-sensing surface of the solar cell is illuminated, the characteristic of the solar cell corresponding to a state corresponding to that the entire photo-sensing surface is illuminated is obtained by performing the following calculations. It is assumed that the characteristic of the solar cell is the same over the surface, and the illuminated portion is one.

For measuring the characteristic of the solar cell, the apparatus, such as the one shown in FIG. 1, with the light source 101 capable of effectively illuminating an area of 225 $cm^2$, 15 cm each side, is used. The mask 102 has a square shape of 20 cm each side, with a square opening, 5 cm each side. As for the solar cell 104, a triple-structure amorphous silicon solar cell having a square shape of 10 cm each side is used.

The solar cell 104 is set on the sample holding stage 105, and the characteristic of the solar cell is measured in the method described above. The measurement result is shown in FIG. 13.

[Experiment 2]

The photo-sensing surface of the square solar cell, 10 cm each side, is divided into four square blocks, 5 cm each side, and a characteristic is measured for each block. Next, assuming that the characteristic of the solar cell is not the same over the photo-sensing surface, after the characteristic of each block is obtained, the characteristics of the four blocks are added to obtain a characteristic of the solar cell in a state corresponding to that the entire photo-sensing surface is illuminated. Note, other conditions are set identical to those in the experiment 1. The measurement result is shown in FIG. 13.

[Experiment 3]

A voltage drop due to a series resistance component of the solar cell is corrected to obtain the characteristic of the solar cell in a state corresponding to that the entire surface of the solar cell is illuminated. Other conditions are set identical to those in the experiment 2. The measurement result is shown in FIG. 13.

[Comparison Experiment]

A characteristic of the solar cell is measured without the mask 102 so that the entire photo-sensing surface of the square solar cell, 10 cm each side, is illuminated at once. In other words, this condition corresponds to a conventional measuring method of measuring a characteristic of a solar cell while illuminating the entire photo-sensing surface. Other conditions are set identical to those in the experiment 1. The measurement result is shown in FIG. 13.

FIG. 13 is a table showing the measurement results of the characteristics of the solar cell obtained in the above respective experiments. From this result, the followings are concluded.

(a) The result of the experiment 1 is about 3.4% greater than the comparison experiment at the maximum power, and about 0.02V larger in an open-circuit voltage.

(b) The result of the experiment 2 is about 2% greater than the comparison experiment at the maximum power. Further, a short-circuit current is approximately the same as that of the comparison experiment. This result on the short-circuit current is due to the diversity of characteristic of the solar cell over the surface reflected to the calculation.

(c) The result of the experiment 3 matched quite well to the result of the comparison experiment in all of the values of the maximum power, the open-circuit voltage, and the short-circuit current. This result is as the effect of the correction for the voltage drop due to the series resistance component of the solar cell.

From the aforesaid result, it is proved that the characteristic of the solar cell having a larger photo-sensing surface than an illuminated area by a light source is correctly measured by using the measuring method of measuring the characteristic of the solar cell according to the present invention.

Note, in the experiments 1 to 3 and the comparison experiment, the square solar cell having relatively small photo-receiving surface, i.e., 10 cm each side, is used. This is to verify whether the characteristic of the solar cell measured by using the measuring method of the present invention matches the characteristic measured by using the conventional measuring method as performed in the comparison experiment.

According to the present invention as described above, a characteristic of a solar cell having a larger photo-sensing surface, too large to prepare a light source capable of illuminating the entire surface at once, than an area effectively illuminated by a light source is measured by using a light source capable of effectively illuminating a smaller area than the photo-sensing surface of the solar cell. Further, when measuring a characteristic of a solar cell having a relatively small photo-sensing area, a light source may be further down-sized, thereby reducing the cost of the measuring apparatus for measuring a characteristic of a solar cell. Consequently, the manufacture cost of a solar cell is reduced, thereby it is possible to provide an inexpensive solar cell.

Note, in addition to using the operational sequences for measuring a characteristic of a solar cell shown by FIGS. 12, 14A and 14B for evaluating a characteristic of the solar cell while developing it, the sequences may be applied to characteristic inspection and product inspection when manufacturing the solar cell. Therefore, a manufacturing sequence including the measuring method of measuring a characteristic of a solar cell as shown by FIGS. 12, 14A and 14B, and a solar cell produced in the manufacturing sequence are also included in the present invention.

Further, the sequences for measuring a characteristic of a solar cell as shown by FIGS. 12, 14A and 14B of the present invention can be also achieved by providing a storage medium storing program codes for performing the processes of the sequence to a computer system or apparatus (e.g., a personal computer), reading the program codes with CPU or MPU of the computer system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The present invention is not limited to the above embodiments and various changes and modifications can be made within the spirit and scope of the present invention. Therefore to apprise the public of the scope of the present invention, the following claims are made.

What is claimed is:

1. A method of measuring a voltage vs. current characteristic of a solar cell comprising the steps of:

segmenting a photo-sensing surface of the solar cell into a plurality of blocks each having a predetermined area;

measuring a first characteristic of the solar cell while alternately illuminating each of the plurality of blocks, wherein an area of the blocks of the photo-sensing surface which is not illuminated during the measurement of each alternate illumination is called a dark area;

measuring a second characteristic of the solar cell in a dark state in which the photo-sensing surface is shielded from light;

calculating a third characteristic of each of the plurality of blocks by multiplying the second characteristic by an area ratio of an area of the dark area, with respect to the corresponding block, to an area of the photo-sensing surface; and calculating a characteristic of each of the plurality of blocks on the basis of the first and third characteristics of the corresponding block.

2. The method according to claim 1, wherein the characteristic calculated on the basis of the first and third characteristics of each of the plurality of blocks corresponds to the voltage vs. current characteristic of each block when the plurality of blocks are substantially separated from each other.

3. The method according to claim 1, further comprising a step of calculating the characteristic of the solar cell by adding the characteristics of the plurality of blocks.

4. The method according to claim 3, further comprising a step of performing inverse-correction for a voltage drop due to a series resistance components of the solar cell on the calculated characteristic of the solar cell.

5. The method according to claim 1, further comprising a step of correcting the first and second characteristics for a voltage drop due to a series resistance components of the solar cell.

6. A method of measuring a voltage vs. current characteristic of a solar cell comprising the steps of:

segmenting a photo-sensing surface of the solar cell into a plurality of blocks each having a predetermined area;

measuring a first characteristic of the solar cell while alternately illuminating each of the plurality of blocks, wherein an area of the blocks of the photo-sensing surface which is not illuminated during the measurement of each alternate illumination is called a dark area;

measuring a second characteristic of the solar cell in a dark state in which the photo-sensing surface is shielded from light;

calculating a third characteristic of the solar cell by adding current values corresponding to voltage values of the first characteristics of the plurality of blocks;

calculating a fourth characteristic by multiplying current values corresponding to voltage values of the second characteristics by N-1 where N is the number of the plurality of blocks; and calculating the voltage vs. current characteristic of the solar cell by subtracting current values corresponding to voltage values of the fourth characteristic from current values corresponding to voltage values of the third characteristic.

7. A method comprising:

a dividing step of dividing a photo-sensing surface of a solar cell into N portions, each portion configured to output a voltage;

a shielding step of shielding the photo-sensing surface of the solar cell from incident light;

a first measuring step of measuring the voltage output from each portion of the photo-sensing surface when all of the portions are shielded;

illuminating, individually, each portion of the photo-sensing surface while the other portions are shielded;

a second measuring step of measuring the voltage output from each portion of the photo-sensing unit while that portion is illuminated and the other portions are shielded;

a first calculating step of calculating a first characteristic of the solar cell by summing the voltages measured in said second measuring step;

a second calculating step of calculating a second characteristic by multiplying the sum of the voltages measured in said first measuring step by N-1; and calculating a characteristic of the solar cell by subtracting the second characteristic from the first characteristic.

\* \* \* \* \*

UNITED STATES PATENT AND TRADEMARK OFFICE
CERTIFICATE OF CORRECTION

PATENT NO. : 6,639,421 B1
DATED : October 28, 2003
INVENTOR(S) : Yoshino et al.

It is certified that error appears in the above-identified patent and that said Letters Patent is hereby corrected as shown below:

<u>Title page,</u>
Item [56], References Cited, U.S. PATENT DOCUMENTS, "Hyvarinen" should read -- Hyvärinen --.

<u>Drawings,</u>
Figure 12, "SELL" should read -- CELL --.

<u>Column 2,</u>
Line 12, "is" should read -- are --.

<u>Column 3,</u>
Line 31, "block" should read -- blocks --.

<u>Column 4,</u>
Line 29, "experiment:" should read -- experiment; --.

<u>Column 6,</u>
Line 12, "contact" should read -- in contact --; and
Line 59, "characteristic" should read -- characteristics --.

<u>Column 7,</u>
Line 32, "Bi" should read -- B1 --; and
Line 42, "sponds" should read -- spond --.

<u>Column 9,</u>
Line 63, "a" (both occurrences) should be deleted.

UNITED STATES PATENT AND TRADEMARK OFFICE
CERTIFICATE OF CORRECTION

PATENT NO.    : 6,639,421 B1
DATED         : October 28, 2003
INVENTOR(S)   : Yoshino et al.

It is certified that error appears in the above-identified patent and that said Letters Patent is hereby corrected as shown below:

<u>Column 10,</u>
Line 48, "other" should read -- another --.

Signed and Sealed this

Fourteenth Day of September, 2004

JON W. DUDAS
*Director of the United States Patent and Trademark Office*